(12) United States Patent
Owhadi Kareshk et al.

(10) Patent No.: US 12,725,080 B2
(45) Date of Patent: Sep. 1, 2026

(54) SIMULTANEOUS DATA SAMPLING AND FEATURE SELECTION VIA WEAK LEARNERS

(71) Applicant: Oracle International Corporation, Redwood Shores, CA (US)

(72) Inventors: Moein Owhadi Kareshk, Burnaby (CA); Ali Seyfi, Vancouver (CA); Hesam Fathi Moghadam, Sunnyvale, CA (US); Sungpack Hong, Palo Alto, CA (US); Hassan Chafi, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 588 days.

(21) Appl. No.: 18/218,970

(22) Filed: Jul. 6, 2023

(65) Prior Publication Data

US 2025/0013909 A1 Jan. 9, 2025

(51) Int. Cl.
*G06N 20/00* (2019.01)

(52) U.S. Cl.
CPC .................................... *G06N 20/00* (2019.01)

(58) Field of Classification Search
CPC ................................ G06N 20/00; G06N 5/01
See application file for complete search history.

(56) References Cited

U.S. PATENT DOCUMENTS 10,318,882 B2 * 6/2019 Brueckner ............. G06N 20/00
11,783,175 B2 * 10/2023 Leskovec ................ G06N 3/08 706/12
11,868,854 B2 * 1/2024 Moharrer ............... G06N 20/00
12,406,478 B2 * 9/2025 Janousková ......... G06V 10/774
2019/0370684 A1 * 12/2019 Gunes ...................... G06N 3/08
2021/0357776 A1 * 11/2021 Quader .................. G06N 20/20
2022/0027680 A1 * 1/2022 Friedland ............. G06F 18/214

OTHER PUBLICATIONS

Yakovlev et al., "Oracle AutoML: a fast and predictive AutoML pipeline", Proc. VLDB Endow. 13, 12, Aug. 2020, 3166-3180.

(Continued)

*Primary Examiner* — Kris E Mackes
(74) *Attorney, Agent, or Firm* — Hickman Becker Bingham Ledesma LLP

(57) ABSTRACT

From many features and many multidimensional points, a computer generates exploratory training configurations. Each point contains a value for each of the features. Each exploratory training configuration identifies a random subset of the features and a random subset of the points. A performance score is generated for each of the exploratory training configurations. A feature weight is generated for each of the features that is based on the performance scores of the exploratory training configurations whose random subset of features contains the feature. A point weight is generated for each of the points that is based on the performance scores of the exploratory training configurations whose random subset of the many points contains the point. A machine learning model is trained using an optimized training corpus that consists of a subset of the many features based on feature weight and a subset of the many points based on point weight.

18 Claims, 4 Drawing Sheets

(56) References Cited

OTHER PUBLICATIONS

Wang et al., "Software defect prediction based on combined sampling and feature selection", ICMLCA , 2nd International Conference on Machine Learning and Computer Application, 2021.
Tsai et al., "Combining feature selection, instance selection, and ensemble classification techniques for improved financial distress prediction.", Journal of Business Research 130, 2021, 200-209.
Sainin et al., "Ensemble Meta Classifier with Sampling and Feature Selection for Data with Multiclass Imbalance Problem", Journal of Information and Communication Technology, 2021.
Kaynak, "Optical Recognition of Handwritten Digits", MSC Thesis, Institute of Graduate Studies in Science and Engineering, Bogazici University, 5 pages, 1995.
Huang et al. "On combining feature selection and over-sampling techniques for breast cancer prediction." Applied Sciences 11.14, 2021, 6574.
Gao et al., "Combining Feature Subset Selection and Data Sampling for Coping with Highly Imbalanced Software Data.", SEKE, 2015.

* cited by examiner

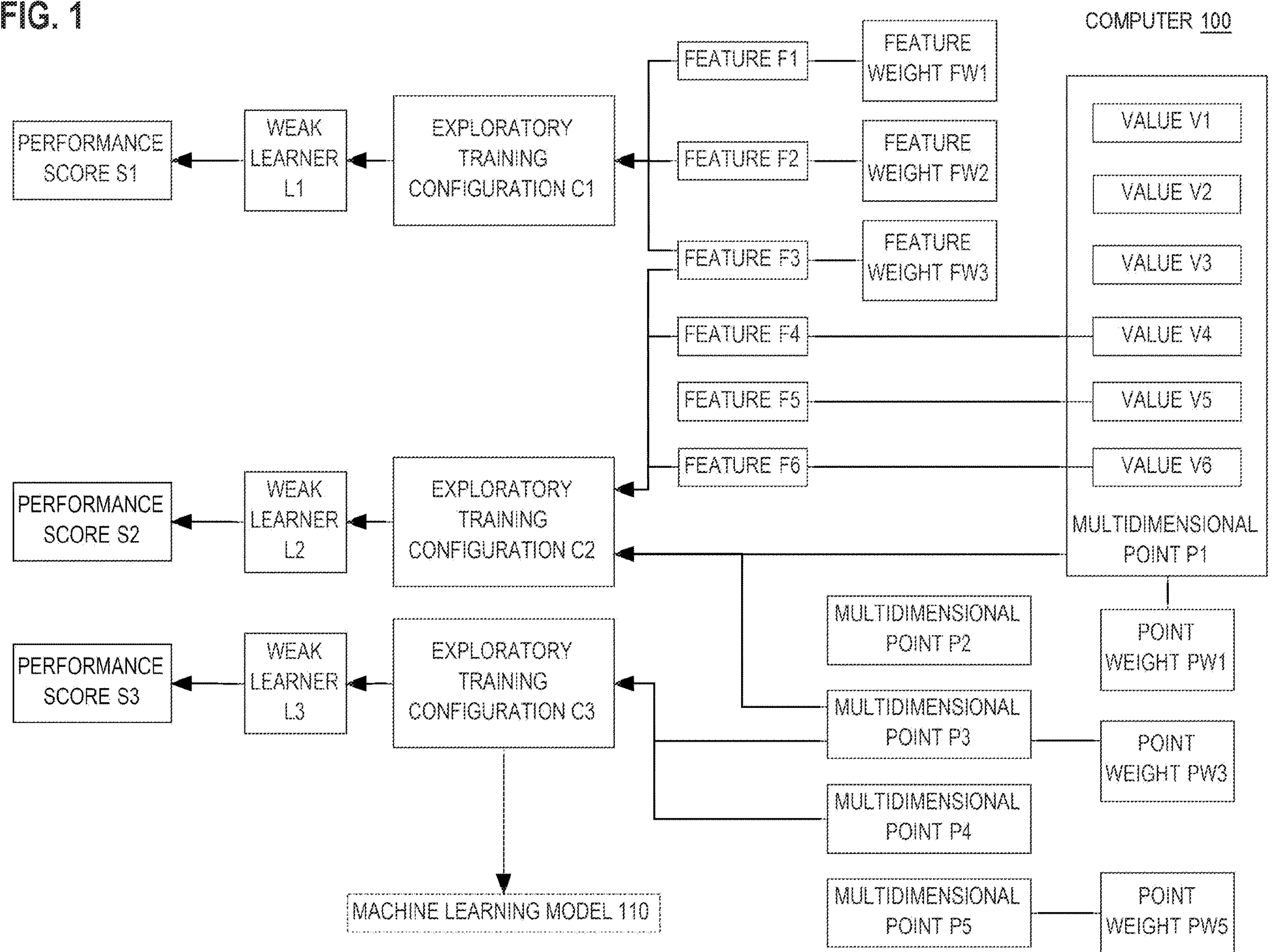
FIG. 1
COMPUTER 100
FEATURE F1
FEATURE WEIGHT FW1
FEATURE F2
FEATURE WEIGHT FW2
FEATURE F3
FEATURE WEIGHT FW3
FEATURE F4
FEATURE F5
FEATURE F6
VALUE V1
VALUE V2
VALUE V3
VALUE V4
VALUE V5
VALUE V6
MULTIDIMENSIONAL POINT P1
PERFORMANCE SCORE S1
WEAK LEARNER L1
EXPLORATORY TRAINING CONFIGURATION C1
PERFORMANCE SCORE S2
WEAK LEARNER L2
EXPLORATORY TRAINING CONFIGURATION C2
PERFORMANCE SCORE S3
WEAK LEARNER L3
EXPLORATORY TRAINING CONFIGURATION C3
MULTIDIMENSIONAL POINT P2
POINT WEIGHT PW1
MULTIDIMENSIONAL POINT P3
POINT WEIGHT PW3
MULTIDIMENSIONAL POINT P4
MULTIDIMENSIONAL POINT P5
POINT WEIGHT PW5
MACHINE LEARNING MODEL 110

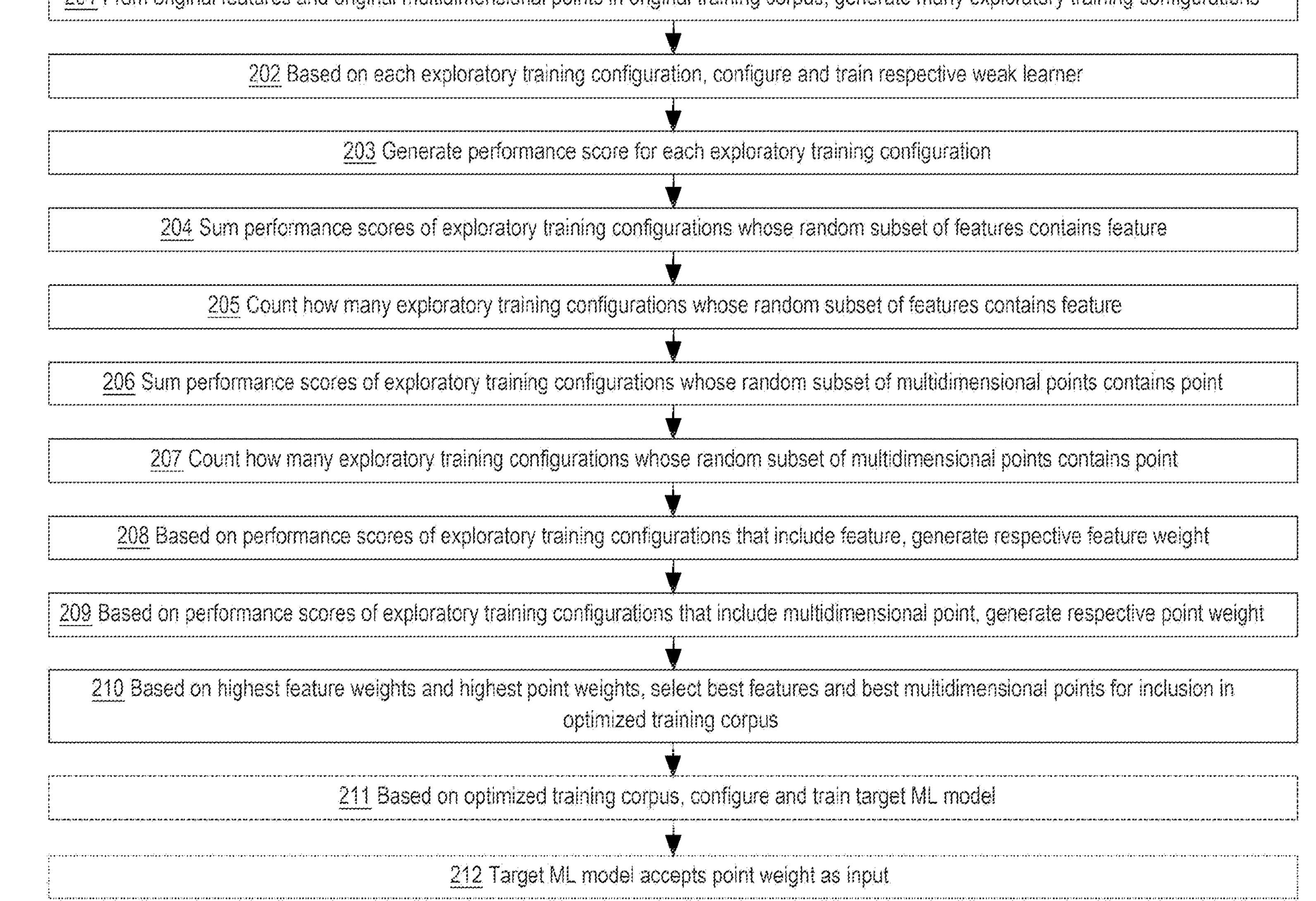
FIG. 2
201 From original features and original multidimensional points in original training corpus, generate many exploratory training configurations
202 Based on each exploratory training configuration, configure and train respective weak learner
203 Generate performance score for each exploratory training configuration
204 Sum performance scores of exploratory training configurations whose random subset of features contains feature
205 Count how many exploratory training configurations whose random subset of features contains feature
206 Sum performance scores of exploratory training configurations whose random subset of multidimensional points contains point
207 Count how many exploratory training configurations whose random subset of multidimensional points contains point
208 Based on performance scores of exploratory training configurations that include feature, generate respective feature weight
209 Based on performance scores of exploratory training configurations that include multidimensional point, generate respective point weight
210 Based on highest feature weights and highest point weights, select best features and best multidimensional points for inclusion in optimized training corpus
211 Based on optimized training corpus, configure and train target ML model
212 Target ML model accepts point weight as input SERVER 330
INTERNET
ISP
328
326
LOCAL NETWORK 322
HOST 324
NETWORK LINK
320
300
STORAGE DEVICE 310
ROM 308
MAIN MEMORY 306
BUS
302
COMMUNICATION INTERFACE 318
PROCESSOR 304
DISPLAY 312
INPUT DEVICE 314
CURSOR CONTROL 316

SOFTWARE SYSTEM 400
402
402A
APPLICATION PROGRAM 1
402B
APPLICATION PROGRAM 2
402C
APPLICATION PROGRAM 3
[...]
402N
APPLICATION PROGRAM N
OPERATING SYSTEM
(e.g., WINDOWS, UNIX, LINUX, MAC OS, IOS, ANDROID, OR LIKE)
410
GRAPHICAL USER INTERFACE (GUI)
415
VIRTUAL MACHINE MONITOR ( VMM)
430
BARE HARDWARE (e.g., COMPUTING DEVICE 300)

SIMULTANEOUS DATA SAMPLING AND FEATURE SELECTION VIA WEAK LEARNERS

FIELD OF THE INVENTION

The present invention relates to machine learning (ML). Herein is concurrent selection of features and training samples to decrease demand of time and space of training and inferencing.

BACKGROUND

Machine learning (ML) and deep learning are becoming ubiquitous for two main reasons: their ability to solve complex problems in a variety of different domains and growth in performance and efficiency of modern computing resources. However, as the complexity of problems continues to increase, so too does the complexity of the ML models applied to these problems.

Collecting more data, either more instances or features is often considered as one of the best ways to improve the accuracy and performance of ML models. While it is not always possible to increase the size of datasets due to the cost of the data collection process and manual data labelling by experts, when it is possible, more data helps the training algorithm not only to find more sophisticated patterns but also to decrease the chance of overfitting. However, there is no guarantee to improve the training process by having more data because duplicated, noisy, and irrelevant data instances or features might have a negative impact on the ML model's accuracy and performance.

The follow concerns may impact feature engineering as follows.

- Data Quality: The quality of the input data has a direct impact on the accuracy and performance of ML models. While the aim is to collect data as much as possible, some aspects of the data such as duplications, high correlations, and missing values decrease the quality of the data.
- Data Sampling: In real-world data, especially in big data, not all instances are representative and helpful to train a better model. Duplicated or highly correlated instances not only increase the training time, but also might decrease the accuracy of ML models. Therefore, data sampling is used to eliminate the data instances that are not helpful to the training process.
- Feature Selection: Similar to instances, not all of the features are helpful to the training process. Features might be irrelevant to the target, noisy, highly-correlated to other features, or duplicated. Thus, only an unknown subset of features are necessary to train ML models.

Data sampling and feature selection are two important steps in machine learning pipelines that are considered separately and implemented separately in the state of the art. Researchers have investigated various implementations of both steps and the best order in which to apply both steps to a given dataset. Applying data sampling and feature selection as two separate steps in the state of the art is suboptimal in time and space.

BRIEF DESCRIPTION OF THE DRAWINGS

In the drawings:

FIG. 1 is a block diagram that depicts an example computer that concurrently selects from features and multidimensional points to decrease demand of time and space of training and inferencing of a machine learning (ML) model;

FIG. 2 is a flow diagram that depicts an example computer process that concurrently selects from features and multidimensional points to decrease demand of time and space of training and inferencing of an ML model;

DETAILED DESCRIPTION

Figure 3:
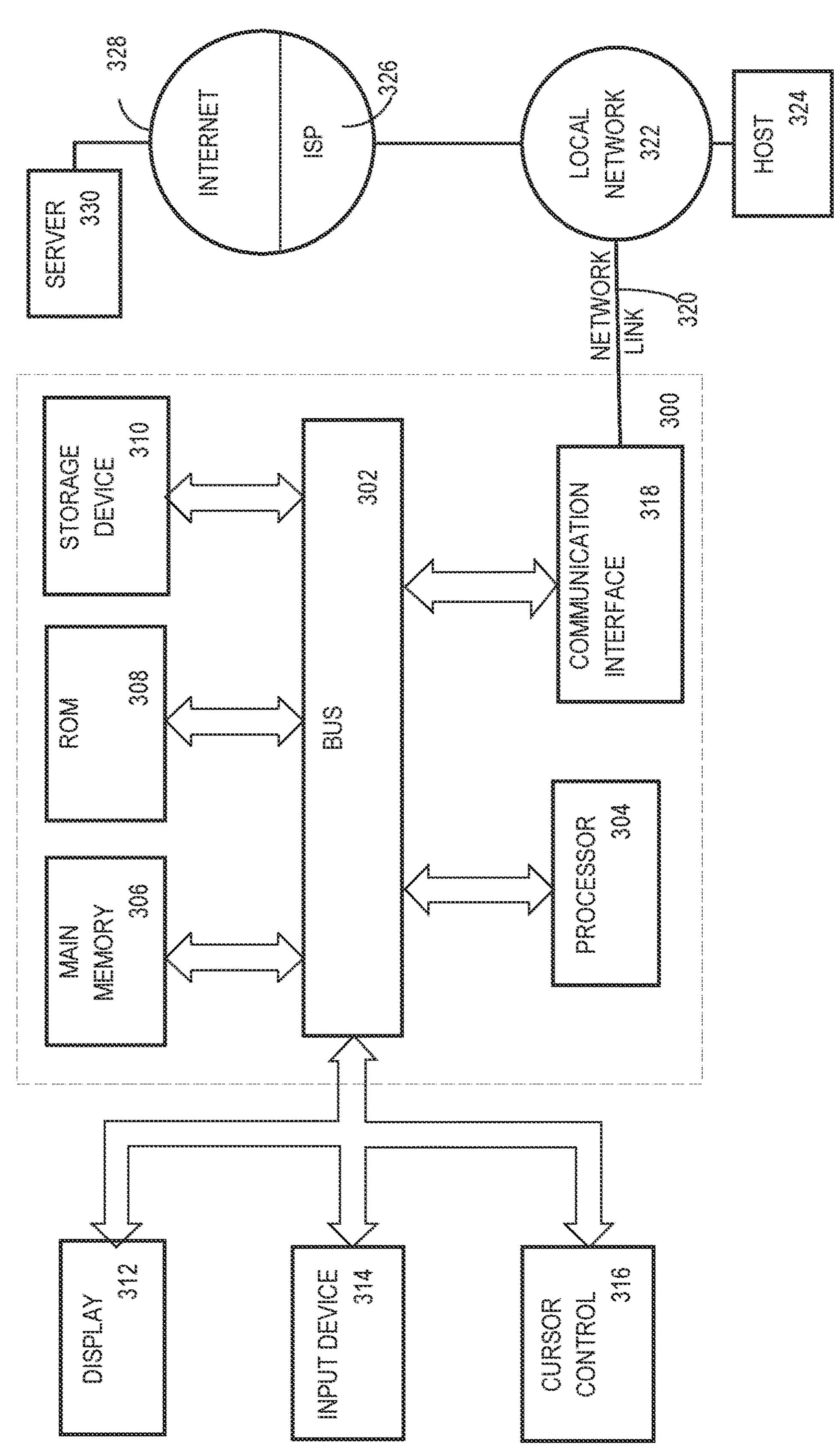
FIG. 3 is a block diagram that illustrates a computer system upon which an embodiment of the invention may be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

For machine learning (ML), herein is concurrent selection of features and training samples to decrease demand of time and space of training and inferencing. This novel approach simultaneously performs both of feature selection and training corpus subsampling in a single step to improve efficiency and decrease resource consumption for ML model training. To facilitate training of ML models, two strategies are implemented herein to select high-quality data instances and features. These strategies are data subsampling and feature selection, which are implemented as unrelated activities in the state of the art. Both are important design steps before training an ML model. Choosing the right subset of data instances and features are two distinctive nondeterministic polynomial (NP)-hard problems and, in the state of the art, are solved by heuristics.

This novel approach performs both of these steps simultaneously as one unified solution. A weight is respectively assigned to each data instance and to each feature. An implementation may iteratively: select a random subset of data instances and features and train a weak learner using that subset. The measured performance of the weak learner is used to adjust the weights of the data instances and features that are used to train a target ML model. Detecting a performant weak learner is an indication that the randomly selected subset is representative, and the associated data instances and features are good candidates to be selected for inclusion in the final reduce dataset. Therefore, the weight of data instances and features determine the chance of them being selected in the final reduced dataset.

Instances and features can be randomly selected based on their corresponding weights, and even a greedy approach that only selects the ones with the highest weights is an effective approach to select the instances and features. The size of the subsamples, as both a count of data instances and a count of features, and also as a count of instances and features to be selected in the final optimized data are among the configurable settings of this technique. In an embodiment, k-fold cross-validation is used for training weak learners to make results as robust as possible.

Using synergism between data sampling and feature selection allows this unified approach to be more efficient than running data sampling and feature selection separately. When both of them run as a unified task, the information about the usefulness of each instance and feature can be captured in one step, rather than during separate independent steps as with the state of the art. Moreover, the approach herein uses weak learners that can be trained and evaluated in parallel (across different feature/instance subsets). Parallelism provides accelerated training.

This approach has at least the following advantages.

Task-agnostic: This method can be used for both supervised and unsupervised tasks.

Model-agnostic: The underlying weak learners can be any straightforward machine learning model.

Scalable: The weak learners are trained in parallel which makes this approach scalable by design.

Time complexity of downstream tasks: Reducing the size of both data instances and features reduces the time complexity of the final machine learning model.

This approach is novel in at least the following ways:

Unifies the data sampling and feature selection tasks into a single activity.

Uses weak learners which are inexpensive to train and evaluate.

Is scalable by design since weak learners can be trained in parallel and without any communication between them.

Provides a set of weights for all data instances and features which can be used for both supervised and unsupervised ML tasks. The target ML algorithm (A) and the utility function (U) should be selected according to the task.

The calculated weights for instances and features can be used to train ML models that accept that external information such as weighted linear regression.

In an embodiment, from many features and many multidimensional points (i.e. data instances), a computer generates various exploratory training configurations. Each multidimensional point contains a value for each of the features. Each exploratory training configuration identifies a random subset of the many features and a random subset of the many multidimensional points. A performance score is generated for each of the exploratory training configurations. A feature weight is generated for each of the many features that is based on the performance scores of the exploratory training configurations whose random subset of features contains the feature. A point weight is generated for each of the many multidimensional points that is based on the performance scores of the exploratory training configurations whose random subset of the many multidimensional points contains the point. A machine learning model is trained using an optimized training corpus that consists of a subset of the many features based on feature weight and a subset of the many multidimensional points based on point weight.

1.0 First Example Computer

FIG. 1 is a block diagram that depicts an example computer 100, in an embodiment. For machine learning (ML), computer 100 concurrently selects from features F1-F6 and multidimensional points P1-P5 to decrease demand of time and space of training and inferencing of ML model 110. Computer 100 may be one or more of a rack server such as a blade, a personal computer, a mainframe, a virtual computer, or other computing device.

A goal of computer 100 is to generate a respective feature weight for each of features F1-F6 and a respective point weight for each of multidimensional points P1-P5, although not all of those weights are shown. For example, feature weight FW3 is generated for feature F3, and point weight PW3 is generated for multidimensional point P3.

Feature weights and point weights are used to select which features and multidimensional points will be used to train ML model 110. In other words, computer 100 can generate an optimized training corpus for ML model 110 from an unoptimized training corpus. Training corpus optimization decreases the size of the training corpus to accelerate training and decreases the size of the feature vector of ML model 110 to accelerate inferencing.

1.1 Dataset Optimization

By training corpus optimization, computer 100 decreases the time and space of training ML model 110 and decreases the time and space of inferencing by ML model 110. ML model 110 is shown with a dashed outline to indicate that ML model 110 is not used for training corpus optimization. For example during training corpus optimization, computer 100 might lack the codebase of ML model 110 and so might be unable to instantiate ML model 110. Training corpus optimization herein needs no knowledge of what hyperparameters does ML model 110 have. In various embodiments, ML model 110 is or is not opaque (i.e. black box).

For example, computer 100 may generate an optimized training corpus and then later: a) instantiate, configure, and train ML model 110 according to the optimized training corpus or b) send the optimized training corpus to another computer that will use it to instantiate, configure, and train ML model 110. Sending the optimized training corpus entails sending either or both of: a) at least an indication of which of features F1-F6 and which of multidimensional points P1-P5 are in the optimized training corpus and/or b) the optimized training corpus itself including some multidimensional points that have values for some features.

1.2 Feature and Multidimensional Point in Dataset

The original (i.e. unoptimized) training corpus contains multidimensional points P1-P5, each of which respectively contains a distinct set of values that includes a respective value for each of features F1-F6. For example if the unoptimized training corpus contains six features F1-F6, then each of multidimensional points P1-P5 contains a distinct set of six values.

However, the optimized training corpus will not contain all six features F1-F6. For example if the optimized training corpus contains only four features F2-F4 and F6, then the optimized training corpus contains multidimensional points that each contain only four values. By selective exclusion of features, training corpus optimization decreases the dimensionality of the training corpus. For example, the optimized training corpus might exclude feature F5 that the unoptimized training corpus contains. By selective exclusion of multidimensional points, training corpus optimization decreases the cardinality of the training corpus. For example, the optimized training corpus might exclude multidimensional point P2 that the unoptimized training corpus contains.

For example, unoptimized multidimensional point P1 that contains six values V1-V6 respectively for six unoptimized features F1-F6 might be selected for inclusion into the optimized training corpus. In that case, the optimized multidimensional point instead contains only four values V2-V4 and V6 respectively for the four optimized (i.e. selected) features F2-F4 and F6. Thus, the optimized training corpus contains vertical (i.e. projected features) and horizontal (i.e. included points) slices of the unoptimized training corpus. Herein, vertical slicing may be referred to as feature selection or dimensionality reduction, and horizontal slicing may be referred to as subsampling, point selection, or cardinality reduction.

1.3 Weight and Rank by Exploration

In an embodiment, training corpus optimization entails ranking (i.e. sorting) features F1-F6 by feature weight and ranking multidimensional points P1-P5 by point weight. In various embodiments, training corpus optimization may use an absolute (i.e. magnitude) or relative (e.g. percentage or fraction) threshold to detect whether a feature or multidimensional point has a weight that is high enough to exceed the threshold for that feature or multidimensional point to be selected for inclusion in the optimized training corpus. For example, only a top fifteen percent of multidimensional points and a top four features may be selected for inclusion in the optimized training corpus. For example, there may be a feature threshold and a point threshold that are predefined, and either threshold may be relative or absolute.

Computer 100 generates an optimized training corpus from a training corpus that is original and unoptimized. Each of those two training corpuses may have a respective training configuration that identifies which features and multidimensional points are included. For example, the original training corpus includes all features and all multidimensional points, and the optimized training corpus includes only selected features and only selected multidimensional points. Likewise, computer 100 generates exploratory training configurations C1-C3 that identify other distinct selections of features and multidimensional points.

For example as shown, exploratory training configuration C2 identifies features F3-F4 and F6 and identifies multidimensional points P1 and P3, which makes exploratory training configuration C2 distinct from all other training configurations. Herein, selection rate is an absolute count or percentage of features or multidimensional points to select for inclusion in each one of exploratory training configurations C1-C3. For example, there may be a feature selection rate and a point selection rate that are predefined. For example as shown, the relative selection rate for features may be 0.5 (i.e. fifty percent) that means each of exploratory training configurations C1-C3 has a random selection of half of features F1-F6. Likewise as shown, the absolute selection rate for multidimensional points may be two that means each of exploratory training configurations C1-C3 has a random selection of two of multidimensional points P1-P5.

A same feature or multidimensional point may be randomly selected for inclusion in none, one, or multiple of exploratory training configurations C1-C3. All training configurations are distinct, including the training configurations (not shown) that represent the original training corpus as is and the optimized training corpus. None of exploratory training configurations C1-C3 are identical to the training configurations of the original and optimized training corpuses.

Exploratory training configurations C1-C3 are temporary and exploratory. Exploratory training configurations C1-C3 are generated, used, and discarded before the optimized training corpus is generated, which means that exploratory training configurations C1-C3 do not coexist with the optimized training corpus.

Although selection rates limit how many features and multidimensional points are included in exploratory training configurations C1-C3, those selection rates do not limit how many features and multidimensional points are included in the optimized training corpus. In other words, the optimized training corpus may have fewer or more features and fewer or more multidimensional points than exploratory training configurations C1-C3 have. For example, exploratory training configuration C1 may be bigger or smaller than the optimized training corpus, but exploratory training configurations C1-C3 have a same size.

How many exploratory training configurations C1-C3 are generated during training corpus optimization depends on the implementation. An embodiment may have a predefined fixed count of exploratory training configurations to generate, or a predefined fixed duration to generate and evaluate as many exploratory training configurations as possible, in which case there is no fixed count of exploratory training configurations. In both of those embodiments, each exploratory training configuration is independently randomly generated and independently evaluated. For example, all exploratory training configurations C1-C3 may be concurrently generated (and evaluated). Another embodiment may have a dynamic criterion to detect when enough exploratory training configurations are generated and may, for example, sequentially generate (and evaluate) exploratory training configurations C1-C3.

1.4 Performance Score of Weak Learner

The purpose of evaluating exploratory training configuration C1 is to generate numeric performance score S1 that estimates the fitness that ML model 110 would achieve if configured and trained with a training corpus defined by exploratory training configuration C1. Generating performance score S1 does not entail ML model 110. Instead, weak learners L1-L3 are proxies for ML model 110. Evaluation (e.g. cross validation) of weak learners L1-L3 empirically measures the fitness of weak learners L1-L3, shown as respective performance scores S1-S3. For example, performance score S3 is both an empirical score of weak learner L3 and an estimated score of ML model 110.

The exploratory training corpus defined by exploratory training configuration C2 is used to train weak learner L2, which achieves performance score S2. Thus in addition to being a fitness score of weak learner L2, performance score S2 also is a suitability score of exploratory training configuration C2. The suitability of exploratory training configuration C2 is based on the importance (i.e. training impact) of exploratory training configuration C2's included features F3-F4 and F6 and included multidimensional points P1 and P3 as shown. Thus, performance score S2 may also be used as (or contribute to) importance scores (i.e. weights) of included features F3-F4 and F6 and included multidimensional points P1 and P3.

That is, performance score S2 contributes only to weights of included features F3-F4 and F6 and included multidimensional points P1 and P3. For example, shown weights FW3, PW1, and PW3 are based on performance score S2, but shown weights FW1-FW2 and PW5 are not based on performance score S2. Thus, a performance score contributes to some but not all feature weights and some but not all point weights.

As shown, feature weight FW3 is based on performance scores S1-S2 but not S3. As shown, point weight PW3 is based on performance scores S2-S3 but not S1. Thus, a feature weight or point weight is based on some but not all performance scores.

By definition, a weak learner trains much faster than a strong learner such as ML model 110. All of weak learners L1-L2 can be concurrently trained in much less time than would be needed to train ML model 110 once. Although weak learner L1 and ML model 110 are different ML models with different architectures, weak learner L1 and ML model 110 have a same objective function for a same training task.

It does not matter whether the training task is classification (e.g. optical character recognition) or regression (e.g. temperature forecasting), so long as the training task and objective function are shared. That is, weak learners L1-L3 should use whatever training task and objective function that ML model 110 would use, even though: a) weak learner L1 and ML model 110 have different codebases and architectures, b) the codebase of ML model 110 may be unavailable during training corpus optimization, and c) weak learners L1-L3 and ML model 110 are all trained with different training configurations. For example, weak learner L1 and ML model 110 may have different implementations of the same objective function, but weak learners L1-L3 share the same implementation of the objective function.

It does not matter whether training of weak learners L1-L3 and ML model 110 is supervised or unsupervised, so long as all are the same. The objective function is designed to accommodate either supervised or unsupervised, but not both. For example, an unsupervised objective function may measure reconstruction error.

1.5 Calculating Weight

In an embodiment discussed later herein, feature weight FW3 is calculated as the average performance score of exploratory training configurations that included feature F3. In that case, feature weight FW3 is the average of performance scores S1-S2 but not S3 as shown. Likewise, point weight PW3 is calculated as the average performance score of exploratory training configurations that included multidimensional point P3. In that case, point weight PW3 is the average of performance scores S2-S3 but not S1 as shown.

After generating performance score S2, exploratory training configuration C2 may be discarded. In some embodiments, performance score S2 and/or weak learner L2 are retained for uses other than training corpus optimization as discussed later herein. If not retained, weak learner L1 may be discarded after performance score S1 is generated. If not retained, performance score S1 may be discarded after all weights are calculated.

2.0 Example Calculation of Feature Weight and Point Weight

FIG. 2 is a flow diagram that depicts an example process that any computer herein may perform for novel generation of an optimized training corpus by novel generation of feature weights and point weights. The ordering of steps 201-212 is demonstrative, and steps 201-212 may be reordered, combined, or interleaved in various embodiments. For example, performing multiple steps together in a single step or concurrently provides additional acceleration.

From original features F1-F6 and original multidimensional points P1-P5 in an original training corpus, step 201 randomly generates many exploratory training configurations C1-C3 as discussed for FIG. 1.

Based on each exploratory training configuration C1-C3, step 202 configures and trains respective weak learners L1-L3 as discussed for FIG. 1. In an embodiment, each of weak learners C1-C3 comprises a trainable decision tree, and ML model 110 may instead have a different architecture that does not have a decision tree. Later herein are various ML model architectures that do or do not have decision tree(s).

Step 203 generates performance score S1-S3 respectively for exploratory training configuration C1-C3 by evaluating the fitness of respective weak learners L1-L3 as discussed for FIG. 1.

Steps 204-205 occur for each of features F1-F6. Steps 206-207 occur for each of multidimensional points P1-P5. In an accelerated embodiment, steps 201-207 are horizontally scaled for acceleration, and the units of concurrency are exploratory training configurations C1-C3. That is, there may be a concurrent thread for each of exploratory training configurations C1-C3, and each thread concurrently performs steps 201-207 based on the exploratory training configuration of the thread.

The following discussion of steps 204-207 may refer to exploratory training configurations C1-C3 being units of concurrency as the accelerated embodiment. However, the process and shown steps of FIG. 2 have a general design that directly accommodates additional embodiments, such as for other granularities of concurrency or no concurrency. In other words, steps 201-212 work well regardless of concurrency.

Step 204 sums performance scores of exploratory training configurations whose included (i.e. random subset) features contains a particular feature. In the accelerated embodiment in step 204, the thread of an exploratory training configuration arithmetically adds the performance score of the exploratory training configuration to the feature weight of each feature included in the exploratory training configuration. For example in step 204, performance score S1 may be respectively added to each of feature weights FW1-FW3. Two threads may invoke step 204 for two exploratory training configurations C1-C2, which adds performance scores S1-S2 to feature weight FW3. In case of contentious (i.e. concurrent) adding, a feature weight should be implemented with a thread safe variable. All feature weights and all point weights are initially zero.

Step 205 counts how many exploratory training configurations whose random subset of features contains a particular feature. In the accelerated embodiment, each feature has a respective thread-safe counter that is initially zero. In step 205, the thread of an exploratory training configuration increments by one the respective counter of each feature included in the exploratory training configuration. For example in step 205, the thread of exploratory training configuration C1 may increment by one the respective counter of each of features F1-F3. Feature F3 is included in two exploratory training configurations C1-C2. Two threads may invoke step 205 for two exploratory training configurations C1-C2, which twice (e.g. contentiously) increments the counter of feature F3.

Step 206 sums performance scores of exploratory training configurations whose included (i.e. random subset) multidimensional points contains a particular multidimensional point. In the accelerated embodiment in step 206, the thread of an exploratory training configuration arithmetically adds the performance score of the exploratory training configuration to the point weight of each multidimensional point included in the exploratory training configuration. For example in step 206, performance score S2 may be respectively added to each of point weights PW1 and PW3. Two threads may invoke step 206 for two exploratory training configurations C2-C3, which (e.g. contentiously) adds performances scores S2-S3 to thread-safe point weight PW3.

Step 207 counts how many exploratory training configurations whose random subset of multidimensional points contains a particular multidimensional point. In the accelerated embodiment, each multidimensional point has a respective thread-safe counter that is initially zero. In step 207, the thread of an exploratory training configuration increments by one the respective counter of each multidimensional point included in the exploratory training configuration. For example in step 207, the thread of exploratory training configuration C2 may increment by one the respective counter of each of multidimensional points P1 and P3. Multidimensional point P3 is included in two exploratory training configurations C1-C2. Two threads may invoke step 207 for two exploratory training configurations C2-C3, which twice (e.g. contentiously) increments the counter of multidimensional point P3.

Step 208 occurs for each of features F1-F6. Step 209 occurs for each of multidimensional points P1-P5. Weak learners L1-L3 may be discarded before step 208 unless needed for a purpose other than training corpus optimization as discussed elsewhere herein. For example, the remainder of process of the FIG. 2 (i.e. steps 208-212) does not use weak learners L1-L3.

Based on performance scores of exploratory training configurations that include a particular feature, step 208 generates a respective feature weight. In the accelerated embodiment and even though exploratory training configurations C1-C3 may cease to be units of concurrency before step 208, the counters of features and counters of multidimensional points are retained for step 208.

Before step 208, feature weights and point weights operate as accumulators for summation of performance scores in above summation steps 204 and 206. These sums (i.e. feature weights and point weights) need normalization provided by averaging step 208 that divides each weight by its corresponding counter. For example, normalization step 208 divides feature weight FW3 by the count (i.e. value of the counter) of feature F3, which in this example means dividing feature weight FW3 by two. In steps 208-209, if a counter is zero, division by zero is avoided, and the result (i.e. normalized weight) of normalization instead is zero. For example if none of exploratory training configurations C1-C3 includes feature F5 as shown, then the unnormalized (i.e. accumulated sum) feature weight of feature F5 is zero and the counter of feature F5 is zero. In that case, normalization step 208 avoids division by zero by leaving that feature weight unchanged (i.e. zero).

Without actually performing ranking (i.e. relative ordering by sorting) of feature weights, nonetheless normalization would likely alter a ranking. For example, feature weight FW2 might be the highest one before normalization step 208, but might no longer be the highest after normalization. Likewise, below normalization step 209 may experience some implicit reranking too.

Based on performance scores of exploratory training configurations that include a particular multidimensional point, step 209 generates a respective point weight. For example in the accelerated embodiment, normalization step 209 divides multidimensional point weight PW3 by the count (i.e. value of the counter) of multidimensional point P3, which in this example means dividing multidimensional point weight PW3 by two.

Performance scores S1-S3 may be discarded before step 210 unless needed for a purpose other than training corpus optimization as discussed elsewhere herein. For example, the remainder of the process of FIG. 2 (i.e. steps 210-212) does not use performance scores S1-S3.

Step 210 generates the optimized training corpus. Based on highest feature weights and highest point weights, step 210 selects best features and best multidimensional points for inclusion in the optimized training corpus. For detecting how many best features and how many best multidimensional points to select, step 210 may use the feature threshold and the point threshold as discussed for FIG. 1. Step 210 may rank features by feature weight, may rank multidimensional points by point weight, and may select features and multidimensional points for inclusion based on those rankings.

Step 210 does not use exploratory training configurations C1-C3 and may select best features and best multidimensional points for inclusion even though: a) some exploratory training configurations include more of those best features, those best multidimensional points, or both than other exploratory training configurations, b) some exploratory training configurations include none of those best features, those best multidimensional points, or both, and/or c) some of those best features, those best multidimensional points, or both are included in fewer exploratory training configurations than are some unselected (i.e. not best) features, multidimensional points, or both.

Before step 211, feature weights and point weights may be discarded unless needed for a purpose other than training corpus optimization as discussed elsewhere herein. In a weighted training embodiment, point weights are retained for use by optional training sub-step 212 as discussed below.

Training step 211 is shown with a dashed outline to indicate that step 211 may occur on a same or different computer. Based on the optimized training corpus, step 211 configures and trains target ML model 110. Step 211 achieves novel acceleration because it uses the optimized training corpus instead of the original training corpus. For example, training corpus optimization on computer 100 by optimization step 210 may later provide acceleration for training step 211 on another computer. After step 211, ML model 110 is ready for production deployment and use (i.e. inferencing).

Step 212 is shown with a dotted outline to indicate that only the weighted training embodiment implements step 212 that is an optional sub-step of training step 211. In step 212, target ML model 110 accepts a point weight as input. For example, the optimized training corpus may include a projection (i.e. only included features) of multidimensional point P1 that, in the weighted training embodiment, still is associated with point weight PW1. During one training inference, ML model 110 may accept, as input, point weight PW1 and the projection of multidimensional point P1. The projection of multidimensional point P1 is contained in a feature vector that ML model 110 accepts as input. Depending on the implementation, the feature vector also contains point weight PW1, or the objective function otherwise accesses point weight PW1. Reinforcement learning (e.g. by adjustment of internal coefficients such as neural weights during backpropagation) is weighted based on the point weight so that more learning occurs from the more important multidimensional points, which accelerates training and increases fitness (e.g. accuracy). For example, an adjustment magnitude may be scaled by multiplication with point weight PW1.

Other exploratory approaches may have some acceleration by parallelizing in some known way. However, any exploratory approach that is gradient-based or greedy is necessarily somewhat sequential to generate progressively (i.e. incrementally) better intermediate solutions until arriving at a best solution. To generate incrementally better intermediate solutions, all intermediate solutions cannot be simultaneously generated, which decelerates the state of the art.

Unlike other exploratory approaches, exploration by the process of FIG. 2 is not greedy, is not based on hill climbing nor gradient descent, and does not use gradients. Randomly generated exploratory training configuration C2 is not a refinement (i.e. incremental improvement) of exploratory training configuration C1. Thus, exploration by the process of FIG. 2 achieves unprecedented horizontal scaling for acceleration that is not attenuated by the sequential incrementalism of other approaches.

The following behaviors would not be possible with incrementalism and with the state of the art. Random generation of exploratory training configuration C2 does not depend on: other exploratory training configurations C1 and C3 nor any of performance scores S1-S3. For example in a demonstrative embodiment, all exploratory training configurations C1-C3 may be (e.g. concurrently) randomly generated before generating any of weak learners L1-L3 and any of performance scores S1-S3.

3.0 First Exemplary Embodiment

Here is a first exemplary (i.e. non-limiting) embodiment of the process of FIG. 2. The following Table 1 shows example elements of the following example Algorithm 1 of the first exemplary embodiment.

| Symbol | Description | Type |
|---|---|---|
| X"×$ | Original data with N instances and D features | Input variable |
| N | No. data instances | Internal variable |
| D | No. features | Internal variable |
| i | Iterator variable for data instance | Internal variable |
| j | Iterator variable for features | Internal variable |
| h | Iterator variable for data subsets | Internal variable |
| $R_!$ | Set on randomly selected instance indices for subset h | Internal variable |
| r | Selection rate for data instances, such that Rows($S_!$) = rN | Configurable setting |
| $C_!$ | Set on randomly selected feature indices for subset h | Internal variable |
| c | Selection rate for features, such that Cols($S_!$) = cD | Configurable setting |
| $S_!$ | The $h^{\%!}$ data subset, $X_{\&'}$, i ∈ $R_!$ and j ∈ $C_($ | Internal variable |
| P | Weight vector of instances | Internal variable |
| Q | Weight vector of features | Internal variable |
| $u_!$ | The utility function value for data subset $S_!$ | Internal variable |
| U(A, $S_!$, k) | The utility function that calculates the utility value $u_!$ for model $M_!$ based on data $S_!$ in a k-fold cross-validation manner. | Configurable setting |
| g | The stopping criterion, e.g., the number of iterations | Configurable setting |
| $M_!$ | The weak learner that is trained on $S_!$ | Internal variable |
| A | The algorithm of the weak learners | Configurable setting |
| k | The number of folds in k-fold cross-validation | Configurable setting |
| α | The number of instances to be selected in the final reduced data | Configurable setting |
| β | The number of features to be selected in the final reduced data | Configurable setting |
| $X^{+)}$×* | The reduced data with α instances and β features | Output variable |

Algorithm 1 operates as follows. While the stopping criterion g is not satisfied, the following steps 1-6 of Algorithm 1 are performed:

1. A subset S! of data instances (i.e. multidimensional points) and features is selected by randomly choosing rN data instances and cD features from the original data X"×$.
2. Model M! is trained using algorithm A and the data subset S!, and its performance is measured by u! using k-fold cross-validation.
3. The weights of data instances (P) and features (Q) that are selected as data subset
4. S! are increased by u!.
5. When g is satisfied, the values are P and Q are normalized according to the frequency of selections (Each instance/weight feature's will be divided by the number of times it was chosen.).
6. αN data instances and βD features with the highest weights P and Q are selected to create the reduced data X+.

The following pseudocode 1 is an example implementation of Algorithm 1 that accepts original data X"×$ as input. Pseudocode 1 has the following configurable settings.

Selection rate for features c

Utility function U.

Stopping criterion g.

Algorithm A.

Number of folds k.

The point threshold as a target count of data instances α.

The feature threshold as a target count of features β

Pseudocode 1 returns the optimized training corpus X+ as output. In pseudocode 1, function RANDOM (v, w) randomly selects and returns w percent of integer numbers in the range [1, v]. Pseudocode 1 has the following steps 1-4 and sub-steps.

```
1.   Initialize weights P = {p& = 0}"   and Q = {q& = 0}$
2.   While g is not satisfied:
     a.        R! = RANDOM(N, r)
     b.        C! = RANDOM(D, c)
     c.        S! = X&', i ∈ R! and j ∈ C!
     d.        u. = U(A, S!, k)
     e.        for i in R!:
               i.  p&+= u.
     f.        for j in C!:
               i.  q'+= u.
```

3. Normalize P and Q according to the number of times that each data instance and feature is selected.
4. Select the αN data instances with the highest weights P and the βD features with the highest weights Q

4.0 Second Exemplary Embodiment

Here is a second exemplary (i.e. non-limiting) embodiment of the process of FIG. 2 that may or may not be based on the first exemplary embodiment. The number of iterations is a thousand and is used as stopping criterion (g). The selection rates for data instances (r) and features (c) both are 0.2. ML model 110 is a Support Vector Classifier (SVC, i.e. support vector machine) model in the open source scikit-learn library. The open source Digits dataset contains 1,797 8×8 images, where each image shows a handwritten digit. Each of multidimensional points P1-P5 is a feature vector that represents a respective distinct image of a handwritten digit. During training, ML model 110 learns to recognize handwritten numeric digits.

The following Table 2 shows settings of hyperparameters of weak learners L1-L3 and ML model 110.

| Model | Hyperparameter | Value |
|---|---|---|
| Weak Learner: Decision Tree Classifier | criterion | gini |
| | min_samples_split | 2 |
| | min_samples_leaf | 1 |
| | min_weight_fraction_leaf | 0 |
| Target Model: Support Vector Classifier | C | 1 |
| | kernel | rbf |
| | degree | 3 |
| | gamma | 'scale' |
| | shrinking | True |
| | tol | 1e−3 |

The point threshold and feature threshold for inclusion in the optimized training corpus may be fractions as low as 0.6 without significant loss of fitness of ML model 110. All F1 scores and execution times are unit normalized to the range of [0.0, 1.0]. In an AutoML pipeline, training ML model 110 with the optimized training corpus may take as little as half as long as using the original training corpus instead.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or solid-state drive is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

Software Overview

Figure 4:
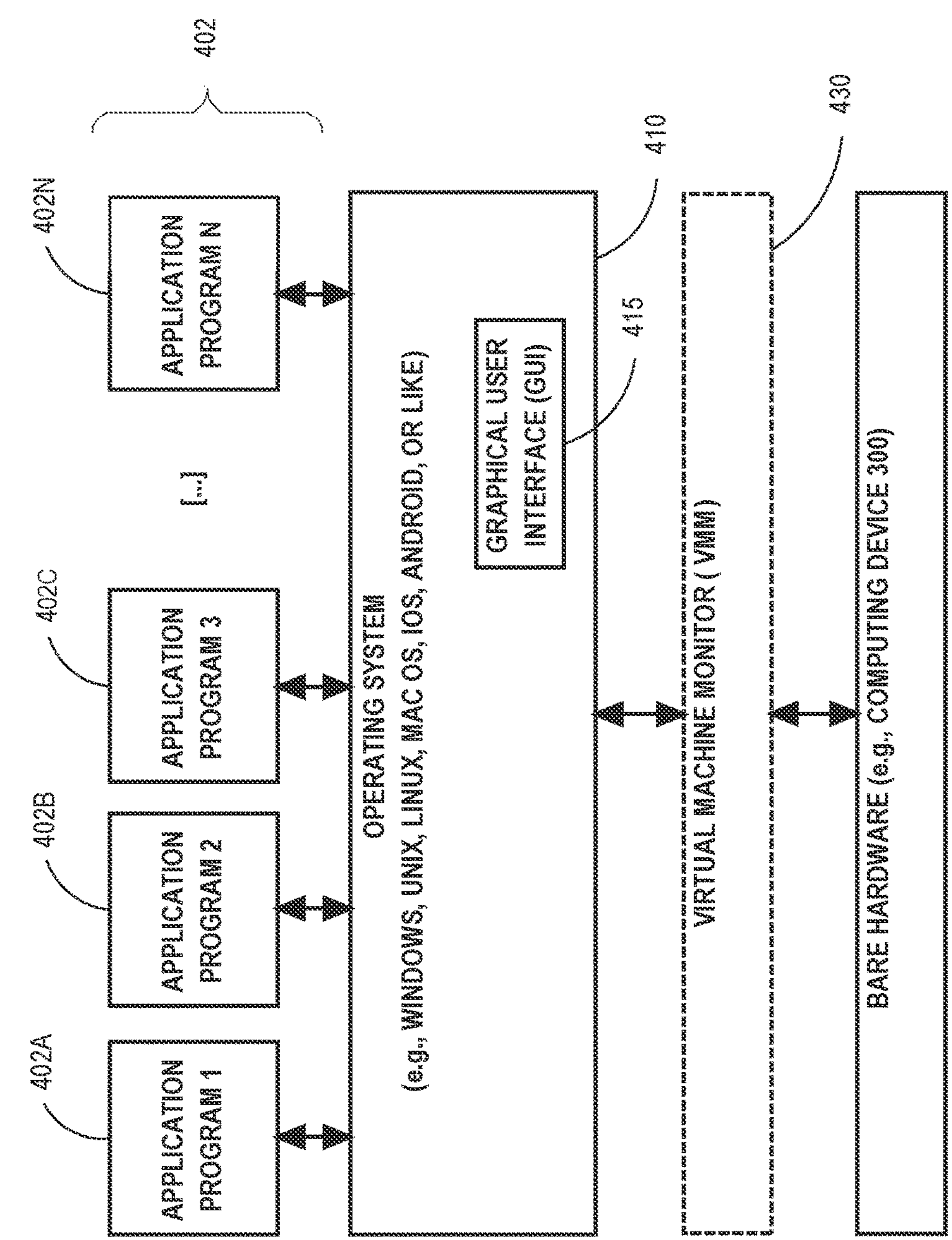
FIG. 4 is a block diagram that illustrates a basic software system that may be employed for controlling the operation of a computing system.

FIG. 4 is a block diagram of a basic software system 400 that may be employed for controlling the operation of computing system 300. Software system 400 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 400 is provided for directing the operation of computing system 300. Software system 400, which may be stored in system memory (RAM) 306 and on fixed storage (e.g., hard disk or flash memory) 310, includes a kernel or operating system (OS) 410.

The OS 410 manages low-level aspects of computer operation, including managing execution of processes, memory allocation, file input and output (I/O), and device I/O. One or more application programs, represented as 402A, 402B, 402C . . . 402N, may be "loaded" (e.g., transferred from fixed storage 310 into memory 306) for execution by the system 400. The applications or other software intended for use on computer system 300 may also be stored as a set of downloadable computer-executable instructions, for example, for downloading and installation from an Internet location (e.g., a Web server, an app store, or other online service).

Software system 400 includes a graphical user interface (GUI) 415, for receiving user commands and data in a graphical (e.g., "point-and-click" or "touch gesture") fashion. These inputs, in turn, may be acted upon by the system 400 in accordance with instructions from operating system 410 and/or application(s) 402. The GUI 415 also serves to display the results of operation from the OS 410 and application(s) 402, whereupon the user may supply additional inputs or terminate the session (e.g., log off).

OS 410 can execute directly on the bare hardware 420 (e.g., processor(s) 304) of computer system 300. Alternatively, a hypervisor or virtual machine monitor (VMM) 430 may be interposed between the bare hardware 420 and the OS 410. In this configuration, VMM 430 acts as a software "cushion" or virtualization layer between the OS 410 and the bare hardware 420 of the computer system 300.

VMM 430 instantiates and runs one or more virtual machine instances ("guest machines"). Each guest machine comprises a "guest" operating system, such as OS 410, and one or more applications, such as application(s) 402, designed to execute on the guest operating system. The VMM 430 presents the guest operating systems with a virtual operating platform and manages the execution of the guest operating systems.

In some instances, the VMM 430 may allow a guest operating system to run as if it is running on the bare hardware 420 of computer system 300 directly. In these instances, the same version of the guest operating system configured to execute on the bare hardware 420 directly may also execute on VMM 430 without modification or reconfiguration. In other words, VMM 430 may provide full hardware and CPU virtualization to a guest operating system in some instances.

In other instances, a guest operating system may be specially designed or configured to execute on VMM 430 for efficiency. In these instances, the guest operating system is "aware" that it executes on a virtual machine monitor. In other words, VMM 430 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Machine Learning Models

A machine learning model is trained using a particular machine learning algorithm. Once trained, input is applied to the machine learning model to make a prediction, which may also be referred to herein as a predicated output or output. Attributes of the input may be referred to as features and the values of the features may be referred to herein as feature values.

A machine learning model includes a model data representation or model artifact. A model artifact comprises parameters values, which may be referred to herein as theta values, and which are applied by a machine learning algorithm to the input to generate a predicted output. Training a machine learning model entails determining the theta values of the model artifact. The structure and organization of the theta values depends on the machine learning algorithm.

In supervised training, training data is used by a supervised training algorithm to train a machine learning model. The training data includes input and a "known" output. In an embodiment, the supervised training algorithm is an iterative procedure. In each iteration, the machine learning algorithm applies the model artifact and the input to generate a predicated output. An error or variance between the predicated output and the known output is calculated using an objective function. In effect, the output of the objective function indicates the accuracy of the machine learning model based on the particular state of the model artifact in the iteration. By applying an optimization algorithm based on the objective function, the theta values of the model artifact are adjusted. An example of an optimization algorithm is gradient descent. The iterations may be repeated until a desired accuracy is achieved or some other criteria is met.

In a software implementation, when a machine learning model is referred to as receiving an input, being executed, and/or generating an output or predication, a computer system process executing a machine learning algorithm applies the model artifact against the input to generate a predicted output. A computer system process executes a machine learning algorithm by executing software configured to cause execution of the algorithm. When a machine learning model is referred to as performing an action, a computer system process executes a machine learning algorithm by executing software configured to cause performance of the action.

Inferencing entails a computer applying the machine learning model to an input such as a feature vector to generate an inference by processing the input and content of the machine learning model in an integrated way. Inferencing is data driven according to data, such as learned coefficients, that the machine learning model contains. Herein, this is referred to as inferencing by the machine learning model that, in practice, is execution by a computer of a machine learning algorithm that processes the machine learning model.

Classes of problems that machine learning (ML) excels at include clustering, classification, regression, anomaly detection, prediction, and dimensionality reduction (i.e. simplification). Examples of machine learning algorithms include decision trees, support vector machines (SVM), Bayesian networks, stochastic algorithms such as genetic algorithms (GA), and connectionist topologies such as artificial neural networks (ANN). Implementations of machine learning may rely on matrices, symbolic models, and hierarchical and/or associative data structures. Parameterized (i.e. configurable) implementations of best of breed machine learning algorithms may be found in open source libraries such as Google's TensorFlow for Python and C++ or Georgia Institute of Technology's MLPack for C++. Shogun is an open source C++ ML library with adapters for several programing languages including C #, Ruby, Lua, Java, MatLab, R, and Python.

Artificial Neural Networks

An artificial neural network (ANN) is a machine learning model that at a high level models a system of neurons interconnected by directed edges. An overview of neural networks is described within the context of a layered feedforward neural network. Other types of neural networks share characteristics of neural networks described below.

In a layered feed forward network, such as a multilayer perceptron (MLP), each layer comprises a group of neurons. A layered neural network comprises an input layer, an output layer, and one or more intermediate layers referred to hidden layers.

Neurons in the input layer and output layer are referred to as input neurons and output neurons, respectively. A neuron in a hidden layer or output layer may be referred to herein as an activation neuron. An activation neuron is associated with an activation function. The input layer does not contain any activation neuron.

From each neuron in the input layer and a hidden layer, there may be one or more directed edges to an activation neuron in the subsequent hidden layer or output layer. Each edge is associated with a weight. An edge from a neuron to an activation neuron represents input from the neuron to the activation neuron, as adjusted by the weight.

For a given input to a neural network, each neuron in the neural network has an activation value. For an input neuron, the activation value is simply an input value for the input. For an activation neuron, the activation value is the output of the respective activation function of the activation neuron.

Each edge from a particular neuron to an activation neuron represents that the activation value of the particular neuron is an input to the activation neuron, that is, an input to the activation function of the activation neuron, as adjusted by the weight of the edge. Thus, an activation neuron in the subsequent layer represents that the particular neuron's activation value is an input to the activation neuron's activation function, as adjusted by the weight of the edge. An activation neuron can have multiple edges directed to the activation neuron, each edge representing that the activation value from the originating neuron, as adjusted by the weight of the edge, is an input to the activation function of the activation neuron.

Each activation neuron is associated with a bias. To generate the activation value of an activation neuron, the activation function of the neuron is applied to the weighted activation values and the bias.

Illustrative Data Structures for Neural Network

The artifact of a neural network may comprise matrices of weights and biases. Training a neural network may iteratively adjust the matrices of weights and biases.

For a layered feedforward network, as well as other types of neural networks, the artifact may comprise one or more matrices of edges W. A matrix W represents edges from a layer L−1 to a layer L. Given the number of neurons in layer L−1 and L is N [L−1] and N [L], respectively, the dimensions of matrix W is N [L−1] columns and N [L] rows.

Biases for a particular layer L may also be stored in matrix B having one column with N [L] rows.

The matrices W and B may be stored as a vector or an array in RAM memory, or comma separated set of values in memory. When an artifact is persisted in persistent storage, the matrices W and B may be stored as comma separated values, in compressed and/serialized form, or other suitable persistent form.

A particular input applied to a neural network comprises a value for each input neuron. The particular input may be stored as vector. Training data comprises multiple inputs, each being referred to as sample in a set of samples. Each sample includes a value for each input neuron. A sample may be stored as a vector of input values, while multiple samples may be stored as a matrix, each row in the matrix being a sample.

When an input is applied to a neural network, activation values are generated for the hidden layers and output layer. For each layer, the activation values for may be stored in one column of a matrix A having a row for every neuron in the layer. In a vectorized approach for training, activation values may be stored in a matrix, having a column for every sample in the training data.

Training a neural network requires storing and processing additional matrices. Optimization algorithms generate matrices of derivative values which are used to adjust matrices of weights W and biases B. Generating derivative values may use and require storing matrices of intermediate values generated when computing activation values for each layer.

The number of neurons and/or edges determines the size of matrices needed to implement a neural network. The smaller the number of neurons and edges in a neural network, the smaller matrices and amount of memory needed to store matrices. In addition, a smaller number of neurons and edges reduces the amount of computation needed to apply or train a neural network. Less neurons means less activation values need be computed, and/or less derivative values need be computed during training.

Properties of matrices used to implement a neural network correspond neurons and edges. A cell in a matrix W represents a particular edge from a neuron in layer L−1 to L. An activation neuron represents an activation function for the layer that includes the activation function. An activation neuron in layer L corresponds to a row of weights in a matrix W for the edges between layer L and L−1 and a column of weights in matrix W for edges between layer L and L+1. During execution of a neural network, a neuron also corresponds to one or more activation values stored in matrix A for the layer and generated by an activation function.

An ANN is amenable to vectorization for data parallelism, which may exploit vector hardware such as single instruction multiple data (SIMD), such as with a graphical processing unit (GPU). Matrix partitioning may achieve horizontal scaling such as with symmetric multiprocessing (SMP) such as with a multicore central processing unit (CPU) and or multiple coprocessors such as GPUs. Feed forward computation within an ANN may occur with one step per neural layer. Activation values in one layer are calculated based on weighted propagations of activation values of the previous layer, such that values are calculated for each subsequent layer in sequence, such as with respective iterations of a for loop. Layering imposes sequencing of calculations that is not parallelizable. Thus, network depth (i.e. amount of layers) may cause computational latency. Deep learning entails endowing a multilayer perceptron (MLP) with many layers. Each layer achieves data abstraction, with complicated (i.e. multidimensional as with several inputs) abstractions needing multiple layers that achieve cascaded processing. Reusable matrix based implementations of an ANN and matrix operations for feed forward processing are readily available and parallelizable in neural network libraries such as Google's TensorFlow for Python and C++, OpenNN for C++, and University of Copenhagen's fast artificial neural network (FANN). These libraries also provide model training algorithms such as backpropagation.

Backpropagation

An ANN's output may be more or less correct. For example, an ANN that recognizes letters may mistake an I as an L because those letters have similar features. Correct output may have particular value(s), while actual output may have somewhat different values. The arithmetic or geometric difference between correct and actual outputs may be measured as error according to a loss function, such that zero represents error free (i.e. completely accurate) behavior. For any edge in any layer, the difference between correct and actual outputs is a delta value.

Backpropagation entails distributing the error backward through the layers of the ANN in varying amounts to all of the connection edges within the ANN. Propagation of error causes adjustments to edge weights, which depends on the gradient of the error at each edge. Gradient of an edge is calculated by multiplying the edge's error delta times the activation value of the upstream neuron. When the gradient is negative, the greater the magnitude of error contributed to the network by an edge, the more the edge's weight should be reduced, which is negative reinforcement. When the gradient is positive, then positive reinforcement entails increasing the weight of an edge whose activation reduced the error. An edge weight is adjusted according to a percentage of the edge's gradient. The steeper is the gradient, the bigger is adjustment. Not all edge weights are adjusted by a same amount. As model training continues with additional input samples, the error of the ANN should decline. Training may cease when the error stabilizes (i.e. ceases to reduce) or vanishes beneath a threshold (i.e. approaches zero). Example mathematical formulae and techniques for feedforward multilayer perceptron (MLP), including matrix operations and backpropagation, are taught in related reference "EXACT CALCULATION OF THE HESSIAN MATRIX FOR THE MULTI-LAYER PERCEPTRON," by Christopher M. Bishop.

Model training may be supervised or unsupervised. For supervised training, the desired (i.e. correct) output is already known for each example in a training set. The training set is configured in advance by (e.g. a human expert) assigning a categorization label to each example. For example, the training set for optical character recognition may have blurry photographs of individual letters, and an expert may label each photo in advance according to which letter is shown. Error calculation and backpropagation occurs as explained above.

Autoencoder

Unsupervised model training is more involved because desired outputs need to be discovered during training. Unsupervised training may be easier to adopt because a human expert is not needed to label training examples in advance. Thus, unsupervised training saves human labor. A natural way to achieve unsupervised training is with an autoencoder, which is a kind of ANN. An autoencoder functions as an encoder/decoder (codec) that has two sets of layers. The first set of layers encodes an input example into a condensed code that needs to be learned during model training. The second set of layers decodes the condensed code to regenerate the original input example. Both sets of layers are trained together as one combined ANN. Error is defined as the difference between the original input and the regenerated input as decoded. After sufficient training, the decoder outputs more or less exactly whatever is the original input.

An autoencoder relies on the condensed code as an intermediate format for each input example. It may be counter-intuitive that the intermediate condensed codes do not initially exist and instead emerge only through model training. Unsupervised training may achieve a vocabulary of intermediate encodings based on features and distinctions of unexpected relevance. For example, which examples and which labels are used during supervised training may depend on somewhat unscientific (e.g. anecdotal) or otherwise incomplete understanding of a problem space by a human expert. Whereas, unsupervised training discovers an apt intermediate vocabulary based more or less entirely on statistical tendencies that reliably converge upon optimality with sufficient training due to the internal feedback by regenerated decodings. Techniques for unsupervised training of an autoencoder for anomaly detection based on reconstruction error is taught in non-patent literature (NPL) "VARIATIONAL AUTOENCODER BASED ANOMALY DETECTION USING RECONSTRUCTION PROBABILITY", Special Lecture on IE. 2015 Dec. 27; 2 (1): 1-18 by Jinwon An et al.

Principal Component Analysis

Principal component analysis (PCA) provides dimensionality reduction by leveraging and organizing mathematical correlation techniques such as normalization, covariance, eigenvectors, and eigenvalues. PCA incorporates aspects of feature selection by eliminating redundant features. PCA can be used for prediction. PCA can be used in conjunction with other ML algorithms.

Random Forest

A random forest or random decision forest is an ensemble of learning approaches that construct a collection of randomly generated nodes and decision trees during a training phase. Different decision trees of a forest are constructed to be each randomly restricted to only particular subsets of feature dimensions of the data set, such as with feature bootstrap aggregating (bagging). Therefore, the decision trees gain accuracy as the decision trees grow without being forced to over fit training data as would happen if the decision trees were forced to learn all feature dimensions of the data set. A prediction may be calculated based on a mean (or other integration such as soft max) of the predictions from the different decision trees.

Random forest hyper-parameters may include: number-of-trees-in-the-forest, maximum-number-of-features-considered-for-splitting-a-node, number-of-levels-in-each-decision-tree, minimum-number-of-data-points-on-a-leaf-node, method-for-sampling-data-points, etc.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:

generating a training corpus by:

a) generating, from a plurality of features and a plurality of multidimensional points, a plurality of training configurations wherein:

each point in the plurality of multidimensional points contains a value for each feature in the plurality of features, and each configuration in the plurality of training configurations identifies a random subset of the plurality of features and a random subset of the plurality of multidimensional points;

b) generating a performance score for each configuration in the plurality of training configurations by training and evaluating a weak learner based on the random subset of the plurality of features of the configuration and the random subset of the plurality of multidimensional points of the configuration;

c) generating a feature weight for each feature in the plurality of features that is based on the performance scores of the plurality of training configurations whose random subset of the plurality of features contains the feature;

d) generating a point weight for each point in the plurality of multidimensional points that is based on the performance scores of the plurality of training configurations whose random subset of the plurality of multidimensional points contains the point; and e) including in the training corpus:

a subset of the plurality of features having feature weights that exceed a first threshold, and a subset of the plurality of multidimensional points having point weights that exceed a second threshold; and training, with the training corpus, a machine learning model that does not comprise a weak learner;

wherein the method is performed by one or more computers.

2. The method of claim 1 wherein:

the weak learner comprises a decision tree; and the machine learning model does not comprise a decision tree.

3. The method of claim 1 further comprising for each feature in the plurality of features, counting how many of the plurality of training configurations whose random subset of the plurality of features of the configuration contains the feature.

4. The method of claim 1 further comprising for each point in the plurality of multidimensional points, counting how many of the plurality of training configurations whose random subset of the plurality of multidimensional points of the configuration contains the point.

5. The method of claim 1 wherein said generating the plurality of training configurations comprises generating a fixed count of training configurations.

6. The method of claim 1 further comprising for each feature in the plurality of features, summing performance scores of the plurality of training configurations whose random subset of the plurality of features of the configuration contains the feature.

7. The method of claim 1 further comprising for each point in the plurality of multidimensional points, summing performance scores of the plurality of training configurations whose random subset of the plurality of multidimensional points of the configuration contains the point.

8. The method of claim 1 wherein at least one selected from a group consisting of:

said generating the plurality of training configurations occurs before said generating the performance score for each configuration in the plurality of training configurations, and said generating the plurality of training configurations does not depend on said generating the performance score for each configuration in the plurality of training configurations.

9. The method of claim 1 wherein said training the machine learning model comprises the machine learning model accepting as input a point weight of a point in the plurality of multidimensional points.

10. One or more non-transitory computer-readable media storing instructions that, when executed by one or more processors, cause:

generating a training corpus by:

a) generating, from a plurality of features and a plurality of multidimensional points, a plurality of training configurations wherein:

each point in the plurality of multidimensional points contains a value for each feature in the plurality of features, and each configuration in the plurality of training configurations identifies a random subset of the plurality of features and a random subset of the plurality of multidimensional points;

b) generating a performance score for each configuration in the plurality of training configurations by training and evaluating a weak learner based on the random subset of the plurality of features of the configuration and the random subset of the plurality of multidimensional points of the configuration;

c) generating a feature weight for each feature in the plurality of features that is based on the performance scores of the plurality of training configurations whose random subset of the plurality of features contains the feature;

d) generating a point weight for each point in the plurality of multidimensional points that is based on the performance scores of the plurality of training configurations whose random subset of the plurality of multidimensional points contains the point; and e) including in the training corpus:

a subset of the plurality of features having feature weights that exceed a first threshold, and a subset of the plurality of multidimensional points having point weights that exceed a second threshold; and training, with the training corpus, a machine learning model that does not comprise a weak learner.

11. The one or more non-transitory computer-readable media of claim 10 wherein:

the weak learner comprises a decision tree; and the machine learning model does not comprise a decision tree.

12. The one or more non-transitory computer-readable media of claim 10 wherein the instructions further cause for each feature in the plurality of features, counting how many of the plurality of training configurations whose random subset of the plurality of features of the configuration contains the feature.

13. The one or more non-transitory computer-readable media of claim 10 wherein the instructions further cause for each point in the plurality of multidimensional points, counting how many of the plurality of training configurations whose random subset of the plurality of multidimensional points of the configuration contains the point.

14. The one or more non-transitory computer-readable media of claim 10 wherein said generating the plurality of training configurations comprises generating a fixed count of training configurations.

15. The one or more non-transitory computer-readable media of claim 10 wherein the instructions further cause for each feature in the plurality of features, summing performance scores of the plurality of training configurations whose random subset of the plurality of features of the configuration contains the feature.

16. The one or more non-transitory computer-readable media of claim 10 wherein the instructions further cause for each point in the plurality of multidimensional points, summing performance scores of the plurality of training configurations whose random subset of the plurality of multidimensional points of the configuration contains the point.

17. The one or more non-transitory computer-readable media of claim 10 wherein at least one selected from a group consisting of:

said generating the plurality of training configurations occurs before said generating the performance score for each configuration in the plurality of training configurations, and said generating the plurality of training configurations does not depend on said generating the performance score for each configuration in the plurality of training configurations.

18. The one or more non-transitory computer-readable media of claim 10 wherein said training the machine learning model comprises the machine learning model accepting as input a point weight of a point in the plurality of multidimensional points.

* * * * *